(12) United States Patent
Delchev

(10) Patent No.: US 9,286,372 B2
(45) Date of Patent: Mar. 15, 2016

(54) CONTENT MANAGEMENT WITH RDBMS

(71) Applicant: Nedelcho Delchev, Sofia (BG)

(72) Inventor: Nedelcho Delchev, Sofia (BG)

(73) Assignee: SAP SE, Walldorf (DE)

( * ) Notice: Subject to any disclaimer, the term of this patent is extended or adjusted under 35 U.S.C. 154(b) by 192 days.

(21) Appl. No.: 14/073,467

(22) Filed: Nov. 6, 2013

(65) Prior Publication Data

US 2015/0127645 A1    May 7, 2015

(51) Int. Cl.
*G06F 17/30* (2006.01)

(52) U.S. Cl.
CPC .... *G06F 17/30595* (2013.01); *G06F 17/30598* (2013.01)

(58) Field of Classification Search
CPC .................................................. G06F 17/30598
See application file for complete search history.

(56) References Cited

U.S. PATENT DOCUMENTS

| 6,662,357 | B1 | 12/2003 | Bowman-Amuah |
| 7,035,851 | B1 * | 4/2006 | Sinclair et al. |
| 7,181,523 | B2 | 2/2007 | Sim |
| 7,219,330 | B2 | 5/2007 | Hogg et al. |
| 7,735,062 | B2 | 6/2010 | Melo et al. |
| 8,473,527 | B2 | 6/2013 | Jentsch |
| 8,473,894 | B2 | 6/2013 | Fox et al. |
| 8,538,184 | B2 | 9/2013 | Neogi et al. |
| 8,571,317 | B2 | 10/2013 | Welling et al. |
| 8,612,936 | B2 | 12/2013 | Fox et al. |
| 2002/0073059 | A1 | 6/2002 | Foster et al. |
| 2007/0011167 | A1 * | 1/2007 | Krishnaprasad et al. ......... 707/9 |
| 2007/0136662 | A1 * | 6/2007 | Khaba ........................... 715/530 |
| 2009/0132562 | A1 | 5/2009 | Mehr et al. |
| 2010/0235380 | A1 * | 9/2010 | Toume .......................... 707/769 |
| 2012/0102383 | A1 | 4/2012 | Liu |
| 2013/0124545 | A1 | 5/2013 | Holmberg et al. |
| 2013/0151317 | A1 | 6/2013 | Charfi et al. |
| 2013/0159993 | A1 | 6/2013 | Misovski et al. |

* cited by examiner

*Primary Examiner* — Kris Mackes
(74) *Attorney, Agent, or Firm* — Buckley, Maschoff & Talwalkar LLC

(57) ABSTRACT

According to some embodiments, a method and an apparatus of using a relational database as an underlying structure of file storage are provided to receive a file and store non-content information associated with the file in a row of a first relational database table. If the content associated with the file is binary content then the content associated with the file is stored in a second relational database table else the content associated with the file is stored in a third relational database table.

14 Claims, 7 Drawing Sheets

| File Path | File Content |
|---|---|
| \Root\WEB\photo.jpg | 1010010111000101010010101001011010010110010001010 |

| File Path | File Content | Order |
|---|---|---|
| \Root\WEB\index.html | xxxxxxxxxxxxxxxxxxxxxxxx | 1 |
| \Root\WEB\index.html | yyyyyyyyyyyyyyyyyyyyyyyy | 2 |
| \Root\WEB\index.html | zzzzzzzzzzzzzzzzzzzzzzzz | 3 |
| | | |

CONTENT MANAGEMENT WITH RDBMS

BACKGROUND

A computer user may create files and store these files, or artifacts on a virtual hard drive or storage folder (e.g., cloud storage). Cloud storage is typically exposed to the user as one or more storage folders, which are used by the user to store the files or artifacts. Physically, the storage folders may span across multiple servers and multiple locations but this is transparent to the user and the user will simply see the one or more storage folders.

Even though the storage folders are visualized as local folders to a user, the fact that the storage folder may span across multiple servers and multiple locations may make implementations of cloud storage inefficient to search and to debug stored files or artifacts.

BRIEF DESCRIPTION OF THE DRAWINGS

FIG. 4 illustrates a portion of a database according to some embodiments.

FIG. 5 illustrates a portion of a database according to some embodiments.

DETAILED DESCRIPTION

The present embodiment relate to a method, apparatus and system to use a Relational Database Management System ("RDBMS") as an underlying technology for cloud storage. The present embodiments describe a schema and behavior of a file storage repository built on top of the RDBMS. Using a RDBMS may have advantages as an underlying technology since it is available as a platform service at most cloud storage providers, its integration is transparent with application servers, it supports multiple users, and it can be implemented as separate schemas.

Figure 1:
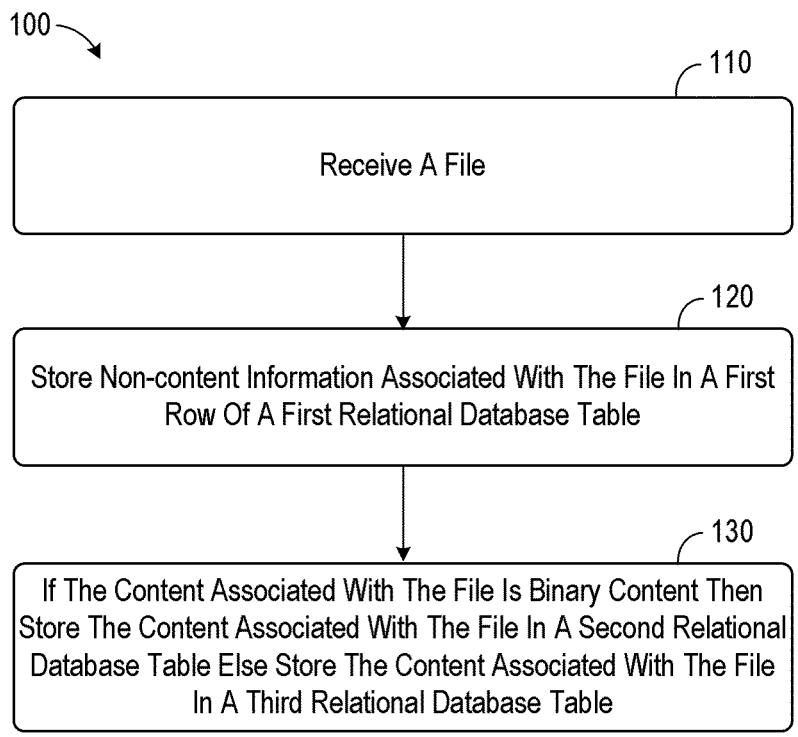
FIG. 1 illustrates a method according to some embodiments.

Referring now to FIG. 1, an embodiment of a method 100 is illustrated. The method 100 may be embodied on a non-transitory computer-readable medium. Furthermore, the method 100 may be performed by an apparatus such as, but not limited to, the apparatus of FIG. 7.

At 110, a file is received. The file may comprise any kind of data file, such as, but not limited to a, HyperText Markup Language ("HTML"), Joint Photographic Expert Group ("JPG"), Tagged Image File Format ("TIFF"), Microsoft word ("DOC"), Microsoft Excel ("XLS"), or Java ("JAV"). The file may be received from a user that is saving the file into a cloud storage folder.

Figure 2:
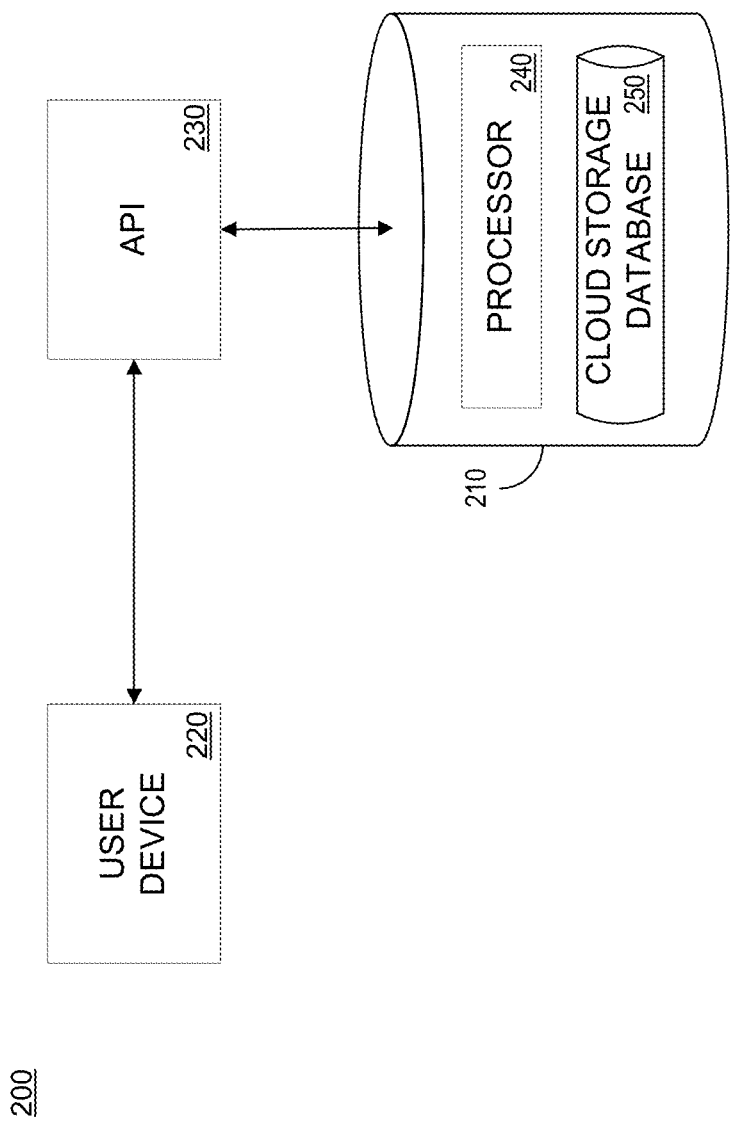
FIG. 2 illustrates a system according to some embodiments.

For illustrative purposes, and to aid in understanding features of the specification, an example will be introduced. This example is not intended to limit the scope of the claims. Now referring to FIG. 2, an embodiment of a system 200 is illustrated.

System 200 comprises a user device 220 in communication with an application programing interface ("API") 230. The user device 220 may comprise a computer, smart phone, tablet device, or other device that comprises a processor and a computer network interface (e.g., wi-fi or a network interface card). The API 230 may act as front end to a RDBMS 210 and, in some embodiments, the API 230 may comprise part of the RDBMS 210 and thus may execute on the RDBMS via processor 240.

In this example, the user device 220 may save two files via the API 230 to a cloud storage database 250 which resides on the RDBMS 210. A user, via the user device 220, may visualize the cloud storage database 250 as a well-known file structure in which references to other computer files, and possibly other directories, are kept such as folders, directories, and/or sub-directories. For example, the user may visualize the cloud storage as a WINDOWS, IOS or UNIX based file system.

In the present example, the first file may be an html file named index.html and the second file may be a jpg file named photo.jpg. The first file may be saved in a directory labeled WEB and the second file may be saved in a directory labeled PHOTOS.

Referring back to FIG. 1, at 120, non-content information associated with the file is stored in a row in a first relational database table. The content may be stored via a processor such as processor 240 of FIG. 2 and processor 703 of FIG. 4. Non-content information may comprise, but is not limited to, a file path of the file, a name of the file, a file type of the file, a file content type of the file, a name of person who created the file, a timestamp when the file was created, a name of a person who last modified the file, and a time stamp when the file was last modified. The non-content information associated with the file may be stored in a row of a database table, such as a table associated with database 250.

Figure 3:
FIG. 3 illustrates a portion of a database according to some embodiments.

Continuing with the above-example, and referring to database table 300 of FIG. 3, the first file may comprise non-content information such as a file path of the file that equals \root\WEB\index.html, a file name of the file that equals index.HTML, a file type of the file of 1 which indicates a document, a file content type of the file which may equal HTML, a name of person who created the file equal to John Smith, a timestamp when the file was created equal to Aug. 15, 2013, a name of a person who last modified the file equal to Robert Jones, and a time stamp when the file was last modified equal to Sep. 3, 2013. The aforementioned information may be stored in a first row of the database table 300. As illustrated in FIG. 3, the file name and the file path fields each contain the name of the file. In some embodiments, having the name is both fields may save CPU time at runtime for parsing a path to a "parent" and a "name" of the file.

The second file may comprise non-content information such as a file path of the file that equals \root\PHOTOS\photo.jpg, a file name of the file that equals photo.jpg, a file type of the file of 2 which indicates a binary file, a file content type of the file which may be a binary large object ("BLOB"), a name of person who created the file equal to Ted Smith, a timestamp when the file was created equal to Dec. 1, 2012, a name of a person who last modified the file equal to Jane Jones, and a time stamp when the file was last modified equal to Oct. 10, 2013. The aforementioned information may be stored in a second row of the database table.

Similarly, non-content information associated with the directory WEB and the directory PHOTOS may each be stored in a respective row of the database with a file path of the directory that equals \root, a file type of 0 which indicates a directory as well as information about who created the directory and when it was last modified.

Referring back to FIG. 1, at 130 if the content associated with the file is binary content then the content associated with the file is stored in a second relational database table else the content associated with the file is stored in a third relational database table.

Continuing with the above example, the file photo.jpg is a binary file and the content of this file may be stored in a table such as table 400 of FIG. 4. As illustrated in FIG. 4, the file path field may be used as foreign key to link the content information in table 400 to the non-content information in table 300. The binary content of photo.jpg, for purposes of this example comprises the following binary string:

"10100101110001010100101001010100101 1010100-
101001001010"

The file index.HTML is a non-binary file and the content of this file may be stored in a table such as table 500 of FIG. 5. Non-binary content may comprise html, text or other types of non-binary related content. The content of index.html, for purposes of this example, comprises the following string"

"xxxxxxxxxxxxxxxxxxxxxxxxxxxxxxxxxxxxxxxxxx-
xxxxxxxxxxxxxxxxxxyyyyyyyyyyyy
yyyyyyyyyyyyyyyyyyyyyyyyyyyyyyyyyyyyyyyyyy-
yyyyyyyzzzzzzzzzzzzzzzzzzzzzzzzzzzzz
zzzzzzzzzzzzzzzzzzzzzzzzzzz"

The string is segmented into three separate rows (e.g., records) of table 500, one for "xxxxxxxxxxxxxxxxxxxxxxxxxxxxxxxxxxxxxxxxxx-xxxxxxxxxxxxxxxxxx", one for "YYYYYYYYYYY-YYYYYYYYYYYYYYYYYYYYYYYYYYYYYYYYYYYYYY-YYYYYYYYYYYYYYY" and one for "zzzzzzzzzzzzzzzzzzzzzzzzzzzzzzzzzzzzzzzzzz-zzzzzzzzz".

To reconstruct the string, each segment may be assigned an assembly order identification (e.g., an order field). In this particular example, the string of Xs may be assigned assembly order identification number 1, the string of Ys may be assigned assembly order identification number 2 and the string of Zs may be assigned assembly order identification number 3. Therefore when re-assembled, the segmented strings (e.g., the three rows in the database table 500) may be combined in an order determined by their respective assembly order identification. In this example, the string Xs would be first followed by the string of Ys and then the string of Zs. Furthermore, as illustrated in FIG. 5, the file path field may be used as foreign key to link the content information in table 500 to the non-content information in table 300.

Figure 6:
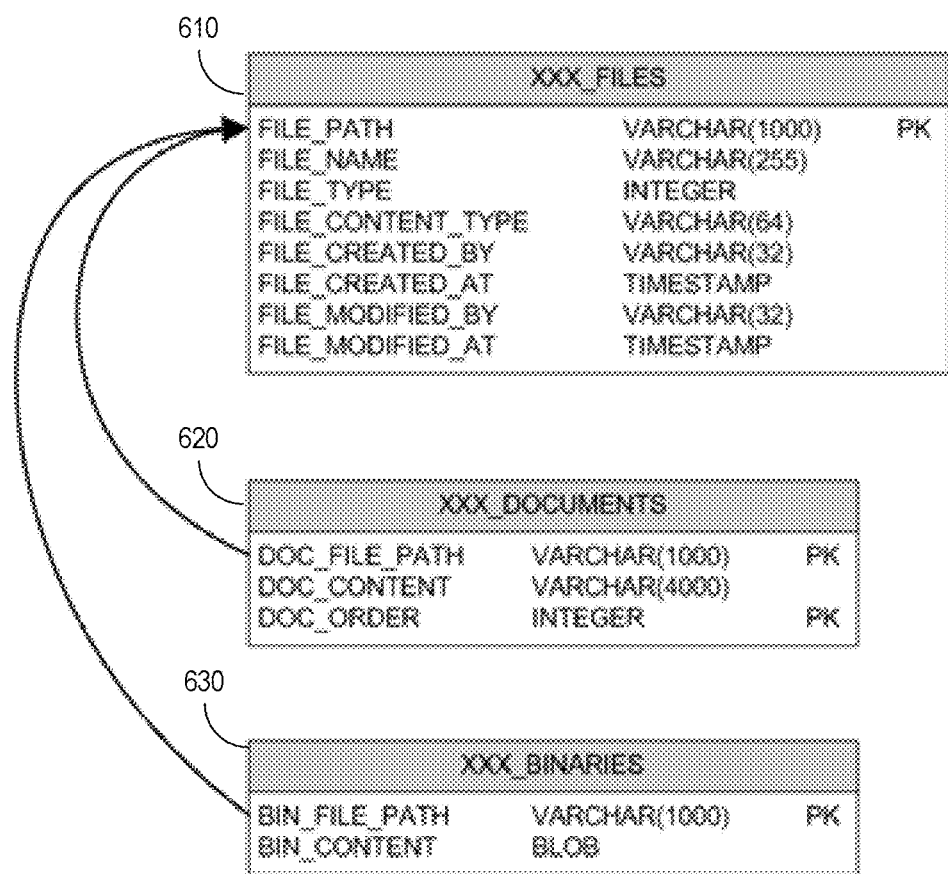
FIG. 6 illustrates a database schema according to some embodiments.

Now referring to FIG. 6, an embodiment of a database schema 600 is illustrated. The database schema may relate to a table for non-content information 610, a table for text content 620 and a table for binary content 630. The database schema may be created using a structured query language ("SQL") script such as the following:

```
CREATE TABLE XXX_FILES ( -- the files and folders registry
    FILE_PATH VARCHAR(1000) NOT NULL PRIMARY KEY,
    FILE_NAME VARCHAR(255) NOT NULL,
    FILE_TYPE INTEGER NOT NULL, -- 0 folder, 1 document,
    2 binary
    FILE_CONTENT_TYPE VARCHAR(64),
    FILE_CREATED_BY VARCHAR(32),
    FILE_CREATED_AT TIMESTAMP,
    FILE_MODIFIED_BY VARCHAR(32),
    FILE_MODIFIED_AT TIMESTAMP
);
CREATE TABLE XXX_DOCUMENTS ( -- the content of segmented
non-binary files
    DOC_FILE_PATH VARCHAR(1000) NOT NULL,
    DOC_CONTENT VARCHAR(4000),
    DOC_ORDER INTEGER NOT NULL,
    PRIMARY KEY (DOC_FILE_PATH, DOC_ORDER)
);
CREATE TABLE XXX_BINARIES ( -- the content of binary files
    BIN_FILE_PATH VARCHAR(1000) NOT NULL,
    BIN_CONTENT BLOB,
    PRIMARY KEY (BIN_FILE_PATH)
);
```

As illustrated in FIG. 6, arrows from tables 620 and 630 may indicate fields that are used as foreign keys.

Figure 7:
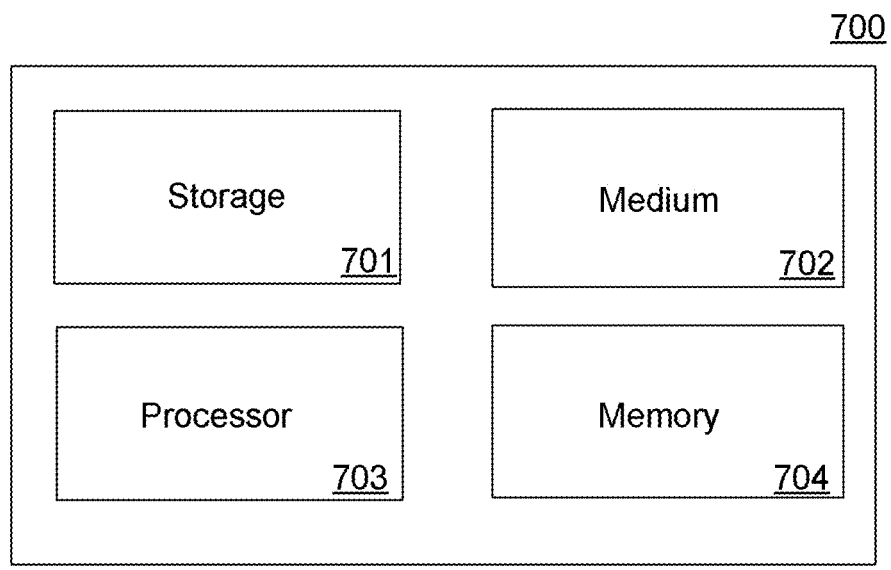
FIG. 7 illustrates an apparatus according to some embodiments.

Now referring to FIG. 7, an embodiment of an apparatus 700 is illustrated. In some embodiments, the apparatus 700 may be associated with a central security manager.

The apparatus 700 may comprise a storage device 701, a medium 702, a processor 703, and a memory 704. According to some embodiments, the apparatus 700 may further comprise a digital display port, such as a port adapted to be coupled to a digital computer monitor, television, portable display screen, or the like.

The medium 702 may comprise any computer-readable medium that may store processor-executable instructions to be executed by the processor 703. For example, the medium 702 may comprise a non-transitory tangible medium such as, but not limited to, a compact disk, a digital video disk, flash memory, optical storage, random access memory, read only memory, or magnetic media.

A program may be stored on the medium 702 in a compressed, uncompiled and/or encrypted format. The program may furthermore include other program elements, such as an operating system, a database management system, and/or device drivers used by the processor 703 to interface with peripheral devices.

The processor 703 may include or otherwise be associated with dedicated registers, stacks, queues, etc. that are used to execute program code and/or one or more of these elements may be shared there between. In some embodiments, the processor 703 may comprise an integrated circuit. In some embodiments, the processor 703 may comprise circuitry to perform a method such as, but not limited to, the method described with respect to FIG. 1.

The processor 703 communicates with the storage device 701. The storage device 701 may comprise any appropriate information storage device, including combinations of magnetic storage devices (e.g., a hard disk drive), optical storage devices, flash drives, and/or semiconductor memory devices. The storage device 701 stores a program for controlling the processor 703. The processor 703 performs instructions of the program, and thereby operates in accordance with any of the embodiments described herein. For example, the processor 703 may determine a database table to store file content information and non-content file information.

The main memory 704 may comprise any type of memory for storing data, such as, but not limited to, a flash driver, a Secure Digital (SD) card, a micro SD card, a Single Data Rate Random Access Memory (SDR-RAM), a Double Data Rate Random Access Memory (DDR-RAM), or a Programmable Read Only Memory (PROM). The main memory 704 may comprise a plurality of memory modules.

As used herein, information may be "received" by or "transmitted" to, for example: (i) the apparatus 700 from another device; or (ii) a software application or module within the apparatus 700 from another software application, module, or any other source.

In some embodiments, the storage device 701 stores a database (e.g., including information associated with malicious network activity). Note that the database described herein is only an example, and additional and/or different information may be stored therein. Moreover, various databases might be split or combined in accordance with any of the embodiments described herein.

Embodiments have been described herein solely for the purpose of illustration. Persons skilled in the art will recognize from this description that embodiments are not limited to those described, but may be practiced with modifications and alterations limited only by the spirit and scope of the appended claims.

What is claimed is:

1. A method of using a relational database as an underlying structure of a cloud file storage, the method comprising:
    receiving a first file comprising first content and first non-content information;
    storing, via a processor, the first non-content information associated with the first file in a a first relational database table;
    in a case that the first content is binary content, storing the first content in a second relational database table;
    in a case that the first content is non-binary content, storing the first content in a third relational database table; and
    in a case that the first content is non-binary content and is of type VARCHAR, (i) segmenting the first content into multiple strings with each string of the multiple strings being stored in a respective row of the third relational database table and (ii) assigning an assembly order identification to each string of the multiple strings so that the multiple strings are ordered based on their respective assembly order identification.

2. The method of claim 1, wherein the content associated with the file is binary content and the first content is stored as type binary large object ("BLOB").

3. The method of claim 1, wherein the non-content information comprises (i) a file path, (ii) a file name, (iii) a file type, and (iv) a file content type.

4. The method of claim 1, wherein the first relational database table, the second relational database table and the third relational database table comprise an underlying structure of a cloud file storage.

5. The method of claim 1, further comprising:
    receiving a second file comprising second content and second non-content information;
    storing, via the processor, the second non-content information in the first relational database table;
    in a case that the second content is binary content, storing the second content in the second relational database table; and
    in a case that the second content is non-binary content, storing the second content in the third relational database table, wherein the first content and the second content comprise different content types.

6. A non-transitory computer-readable medium comprising instructions that when executed by a processor perform a method of using a relational database as an underlying structure of file storage, the method comprising:
    receiving a first file comprising first content and first non-content information;
    storing, via a processor, the first non-content information associated with the first file in a a first relational database table;
    in a case that the first content is binary content, storing the first content in a second relational database table;
    in a case that the first content is non-binary content, storing the first content in a third relational database table; and
    in a case that the first content is non-binary content and is of type VARCHAR, (i) segmenting the first content into multiple strings with each string of the multiple strings being stored in a respective row of the third relational database table and (ii) assigning an assembly order identification to each string of the multiple strings so that the multiple strings are ordered based on their respective assembly order identification.

7. The medium of claim 6, wherein the content associated with the file is binary content and the first content is stored as type binary large object ("BLOB").

8. The medium of claim 6, wherein the non-content information comprises (i) a file path, (ii) a file name, (iii) a file type, and (iv) a file content type.

9. The medium of claim 8, wherein the file type comprises one of (i) a folder type, (ii) a document, or (iii) binary.

10. The method of claim 6, wherein the method further comprises:
    receiving a second file comprising second content and second non-content information;
    storing, via the processor, the second non-content information in the first relational database table;
    in a case that the second content is binary content, storing the second content in the second relational database table; and
    in a case that the second content is non-binary content, storing the second content in the third relational database table, wherein the first content and the second content comprise different content types.

11. An apparatus comprising:
    a processor; and
    a non-transitory computer-readable medium comprising instructions that when executed by the processor perform a method of using a relational database as an underlying structure of file storage, the method comprising:
        receiving a first file comprising first content and first non-content information;
        storing, via the processor, the first non-content information associated with the first file in a first relational database table;
    in a case that the first content is binary content, storing the first content in a second relational database table;
    in a case that the first content is non-binary content, storing the first content in a third relational database table; and
    in a case that the first content is non-binary content and is of type VARCHAR, (i) segmenting the first content into multiple strings with each string of the multiple strings being stored in a respective row of the third relational database table and (ii) assigning an assembly order identification to each string of the multiple strings so that the multiple strings are ordered based on their respective assembly order identification.

12. The apparatus of claim 11, wherein the content associated with the file is binary content and the first content is stored as type binary large object ("BLOB").

13. The apparatus of claim 11, wherein the non-content information comprises (i) a file path, (ii) a file name, (iii) a file type, and (iv) a file content type.

14. The apparatus of claim 11, wherein the method further comprises:
    receiving a second file comprising second content and second non-content information;
    storing, via the processor, the second non-content information in the first relational database table;
    in a case that the second content is binary content, storing the second content in the second relational database table; and in a case that the second content is non-binary content, storing the second content in the third relational database table, wherein the first content and the second content comprise different content types.

* * * * *